United States Patent
Raff et al.

(10) Patent No.: US 11,637,864 B2
(45) Date of Patent: Apr. 25, 2023

(54) HARDENING OF CLOUD SECURITY POLICIES

(71) Applicant: RADWARE, LTD., Tel Aviv (IL)

(72) Inventors: Adi Raff, Modiin (IL); Amnon Lotem, Ramot Hashavim (IL); Yaniv Amram, Tel Aviv (IL); Leo Reznik, Tel Aviv (IL); Tal Halpern, Eshtaol (IL); Nissim Pariente, Kiryat Ono (IL)

(73) Assignee: RADWARE LTD., Tel Aviv (IL)

( * ) Notice: Subject to any disclaimer, the term of this patent is extended or adjusted under 35 U.S.C. 154(b) by 259 days.

(21) Appl. No.: 16/429,699

(22) Filed: Jun. 3, 2019

(65) Prior Publication Data
US 2020/0259865 A1   Aug. 13, 2020

Related U.S. Application Data

(60) Provisional application No. 62/805,112, filed on Feb. 13, 2019.

(51) Int. Cl.
*H04L 29/06* (2006.01)
*H04L 9/40* (2022.01)
*H04L 41/28* (2022.01)

(52) U.S. Cl.
CPC .............. *H04L 63/20* (2013.01); *H04L 41/28* (2013.01); *H04L 63/0263* (2013.01); *H04L 63/101* (2013.01)

(58) Field of Classification Search
CPC ... H04L 63/20; H04L 63/0263; H04L 63/101; H04L 63/145; H04L 63/1433; H04L 41/28
USPC ............................................................ 726/2
See application file for complete search history.

(56) References Cited

U.S. PATENT DOCUMENTS

| | | | |
|---|---|---|---|
| 9,069,599 B2* | 6/2015 | Martinez | H04L 63/102 |
| 2006/0005228 A1* | 1/2006 | Matsuda | H04L 63/0263 726/1 |
| 2019/0065711 A1* | 2/2019 | Seo | G06F 9/451 |

* cited by examiner

*Primary Examiner* — Longbit Chai
(74) *Attorney, Agent, or Firm* — M&B IP Analysts, LLC

(57) ABSTRACT

A method and system for hardening cloud security policies of a cloud computing platform are presented. The method includes gathering cloud activity logs from at least the cloud computing platform, wherein the cloud computing platform includes a plurality of cloud entities; gathering a plurality of cloud security policies provisioned to protect the cloud entities; for each of the plurality of cloud security policies, generating a permission usage map, wherein the permission usage map represents the permissions granted to each cloud entity and the permissions used by each cloud entity; analyzing the permission usage map to discover at least one hardening gap, wherein each hardening gap is at least a difference between permissions granted and permissions used by a cloud entity; for each discovered hardening gap, computing a risk score designating a potential risk reduction achieved by addressing the hardening gap; generating at least one hardening recommendation for the at least one hardening gap and its respective computed risk score; and applying the at least one hardening recommendation to the respective cloud security policy, thereby hardening the cloud computing platform.

33 Claims, 12 Drawing Sheets

FIG. 5

Policy Unit PU2- Permission Usage Map 620

|  | p1 | p3 | p4 |
|---|---|---|---|
| e1 | ✓ |  | ✓ |
| e3 | ✓ | ✓ | ✓ |
| e4 | ✓ | ✓ |  |

FIG. 6B

HARDENING OF CLOUD SECURITY POLICIES

CROSS-REFERENCE TO RELATED APPLICATIONS

This application claims the benefit of U.S. Provisional Application No. 62/805,112 filed on Feb. 13, 2019, the contents of which are hereby incorporated by reference.

TECHNICAL FIELDS

The disclosed embodiments generally relate to the hardening of cloud security policies.

BACKGROUND

Computer systems have become increasingly subject to cyber-attacks intended to disrupt the systems, steal data, cause application defacement, manipulate behavior, or a combination of these. Accordingly, the field of cyber security has developed to combat such cyber-attacks. Cyber security is particularly important in cloud computing platforms, where multiple computer resources interact remotely in order to provide the required services, e.g., sharing of files and applications. Organizations have increasingly adapted their applications to cloud computing platforms. Some leading public cloud service providers include Amazon®, Microsoft®, Google®, Oracle®, and so on.

Public cloud computing platforms (or simply "cloud" or "clouds") are very dynamic in nature, with a large number of cloud entities of different types. Such entities include users, machines, resources, and services. Typically, security policies are used to define the permissions allowed for such entities. The complexity and the dynamic nature of a cloud may lead to situations where entities are provisioned with permissions that are not actually required.

Overly permissive security policies, may expose an organization utilizing the cloud, to cyber-security risks. That is, cyber attackers may exploit permissions to access services, resources, and machines within the cloud's environment. Therefore, to secure cloud environments, entities' permissions may be carefully provisioned to limit opportunities for attackers.

Hardening the security policies of clouds is a challenging task as such policies are complex and apply to many entities in a dynamic environment. Further, hardening security policies to become too restrictive may impose operational risks. For example, disabling a permission needed for normal operation of the entity may cause damage to service and operation continuity.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for hardening cloud security policies of a cloud computing platform. The method includes gathering cloud activity logs from at least the cloud computing platform, wherein the cloud computing platform includes a plurality of cloud entities; gathering a plurality of cloud security policies provisioned to protect the cloud entities; for each of the plurality of cloud security policies, generating a permission usage map, wherein the permission usage map represents the permissions granted to each cloud entity and the permissions used by each cloud entity; analyzing the permission usage map to discover at least one hardening gap, wherein each hardening gap is at least a difference between permissions granted and permissions used by a cloud entity; for each discovered hardening gap, computing a risk score designating a potential risk reduction achieved by addressing the hardening gap; generating at least one hardening recommendation for the at least one hardening gap and its respective computed risk score; and applying the at least one hardening recommendation to the respective cloud security policy, thereby hardening the cloud computing platform.

Certain embodiments disclosed herein include a system for causing processing circuity to execute a process for hardening cloud security policies of a cloud computing platform, the system comprising: a processing system; and a memory, the memory containing instructions that, when executed by the processing system, configure the system to: gather cloud activity logs from at least the cloud computing platform, wherein the cloud computing platform includes a plurality of cloud entities; gather plurality of cloud security policies provisioned to protect the cloud entities; for each of the plurality of cloud security policies, generating a permission usage map, wherein the permission usage map represents the permissions granted to each cloud entity and the permissions used by each cloud entity; analyze the permission usage map to discover at least one hardening gap, wherein each hardening gap is at least a difference between permissions granted and permissions used by a cloud entity; for each discovered hardening gap, compute a risk score designating a potential risk reduction achieved by addressing the hardening gap; generate at least one hardening recommendation for the at least one hardening gap and its respective computed risk score; and applying the at least one hardening recommendation to the respective cloud security policy, thereby hardening the cloud computing platform.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 illustrates possible attributes of a permission privilege map.

FIGS. 6A, 6B, and 6C illustrate a permission privilege map modified based on hardening recommendations generated according to an embodiment.

DETAILED DESCRIPTION

Figure 1:
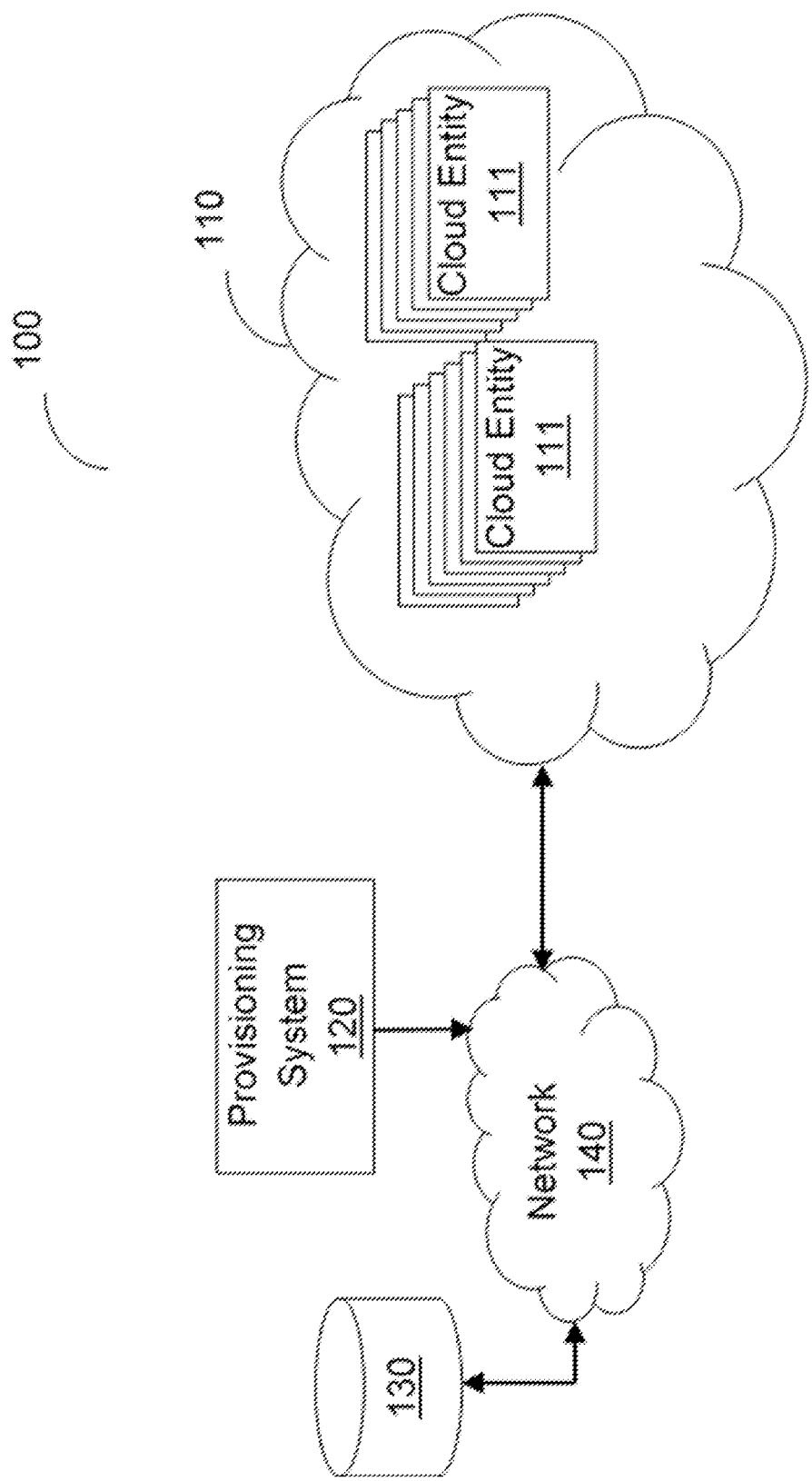
FIG. 1 is an example network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for hardening cloud security policies. In an embodiment, cloud security policies may be of different types defined for different entities, such as policies defined for services, machines, and storage. The number of typical policies in a cloud environment may need to be defined for thousands of entities.

FIG. 1 is an example network diagram 100 utilized to describe the various disclosed embodiments. The network diagram 100 demonstrates at least one cloud computing platform 110, a provisioning system (hereinafter "the system" 120), and a policy storage 130. In one configuration, all elements shown in FIG. 1 communicate through a network 140. In another configuration, some or all of the elements shown in FIG. 1 are part of the cloud computing platform 110. The network 140 may be, for example, the Internet.

The cloud computing platform 110 may be, but is not limited to, a public cloud, a private cloud, or a hybrid cloud. Example cloud computing platforms include: Amazon® Web Services (AWS), Cisco® Metacloud, Microsoft®, Azure®, Google® Cloud Platform, HP® Cloud, and the like. In an embodiment, the cloud computing platform may serve as: infrastructure-as-a-service (IaaS), Platform-as-a-Service (PaaS), Function as a Service (FaaS), or a combination thereof.

The cloud computing platform 110 is configured with a plurality of cloud entities (individually referred to as an "entity" 111 or collectively as "entities" 111). An entity 111 is any entity in the platform 110 provisioned with a set of permissions. Examples for an entity 111 may include a user, a virtual software entity (such as a virtual machine, a software container element (e.g., Kubernetes node or pod), a serverless function, and the like), a storage unit (or any computing resource), a cloud service, a cloud application, a subnet, a collection of subnets (e.g., AWS® VPC), a role, and the like. An entity group permission can be specified directly to an entity or to a predefined group of entities. An entity 111 can perform an action in the cloud computing platform 110. For example, a call to an API of a cloud service, receiving or sending a communication packet (an action of a machine), retrieving a file from a cloud storage, and the like.

Each entity 111 is configured with a permission to use or provide a service, capability, resource, API, or network access to the entity 111. For example, a permission may define the terms to call a certain API of a cloud service under certain conditions, a cloud virtual machine to communicate through to a certain port from certain source IP addresses, or a user to read data from a certain area (folder) in a cloud storage service.

The system 120 is configured to analyze cloud security policies (hereinafter "policies" or a "policy") stored in the storage 130. The policies may be initially configured or provisioned by an administrator of an organization utilizing the entities 111.

A policy is a specification of a set of permissions of a certain type for the entities 111 in the cloud computing platform 110. A policy includes a collection of policy units. Each policy unit may be associated with a specified entity or group of entities. A policy unit is a combination of policy rules. A policy rule is a statement or structure that expresses one or more permissions according to some convention. The permissions can be allowed or denied by a policy rule. The policy rules may be ordered or have precedence. The set of permissions defined in a policy or policy unit may depend on the order or precedence of the policy rules.

According to the disclosed embodiments, the system 120 is configured to determine hardening recommendations for the entities 111. Then, the system 120 may provision the entities 111 with the new hardened policies. In an embodiment, the hardening process includes identifying a gap between granted and used permissions as defined in policies stored in the storage 130. Based on the identified gap, the system 120 is further configured to generate hardening recommendations on how to fix each policy. That is, the hardening recommendation may provide alternatives, complements, or reduced permissions to resolve the identified gap(s).

The system 120 is further configured to generate policy change instructions for changing (editing) a policy and any related entity groups. Examples for hardening recommendations include changing the content of a policy rule, removing a specified rule from a policy unit, and disassociating a policy unit from an entity. The policy change instructions may be communicated to the cloud computing platform 110 using an API. Therefore, the system 120 is configured to improve the hardening status of the policies and to keep that status in a low risk level over time.

According to one embodiment, the system 120 is configured to collect the required information from the cloud computing platform 110 and the storage 130. The collected information may include policy specifications, entities, entity group information, and cloud activity logs. The system 120 is further configured to analyze each policy and activity log to determine the gap and generate hardening recommendations. Based on the analysis, the system 120 may also compute exposure and risk metrics.

The system 120 may further consider user preferences, related to the cloud computing platform 110, when determining and prioritizing discovered hardening gaps and recommendations. The system 120 may be further configured to manage a workflow of discovered hardening gaps and recommendations in which different roles and users may be involved.

In an embodiment, the system 120 is configured to translate hardening recommendations into actionable changes of the policies and pushing the changes to the cloud computing platform 110 (i.e., providing the entities 110 with the required changes of the policies).

In another embodiment, the system 120 may include one or more user interface. The user interfaces may present information to a user such as hardening recommendations, exposure level, risk level, the identified gaps, and so on. The information may be displayed through dashboards, reports, charts, tables, or other textual or graphical representations. In some embodiments, the user may be required to approve the hardening recommendations.

It should be noted that the example implementation shown in FIG. 1 is described with respect to the entities in a single cloud computing platform 110 merely for simplicity purposes and without limitation on the disclosed embodiments. More or fewer cloud computing platforms, data centers, or both, may be protected without departing from the scope of the disclosure.

Figure 2:
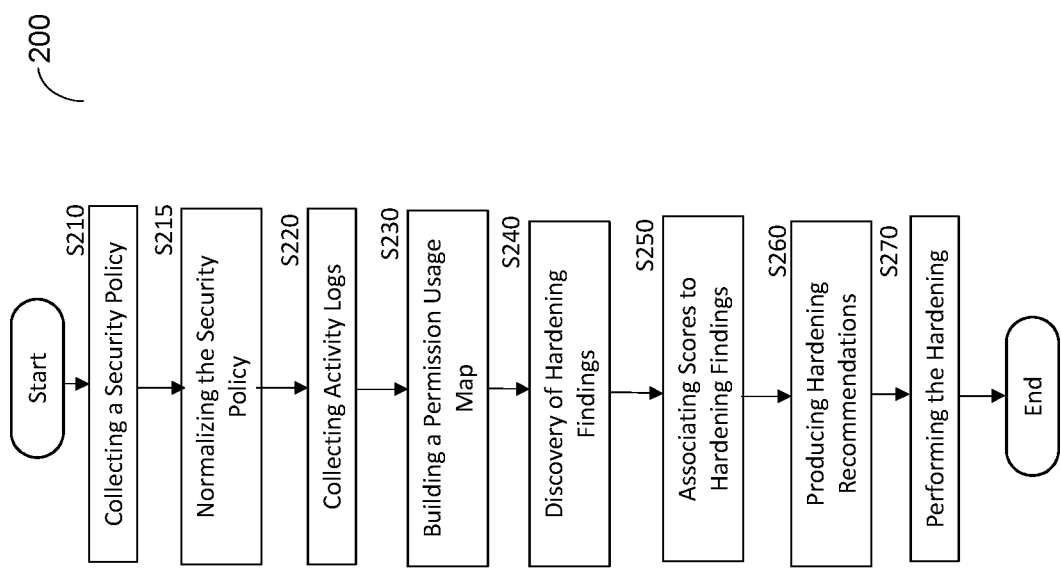
FIG. 2 is a flowchart of a method for hardening cloud security policies according to an embodiment.

FIG. 2 is an example flowchart 200 of a method for hardening policies according to an embodiment. In an embodiment, the method is performed by the system 120.

At S210, policies defined for one or more cloud entities are gathered. The policies can be gathered from a cloud computing platform, through an API, through a dedicated storage utilize to store the policies, or a combination thereof.

Specifically, for each policy, elements of a desired policy are also collected. That may include policy units, policy rules, association of policy units to entities and entity groups, entity groups definitions, and information on cloud actions. The collected policies may be of different types, examples of which are provided above.

At S215, the gathered policies are normalized to be presented in a unified (normalized) representation. Such representation allows for efficiently extracting the set of permissions that each client entity is configured with. The normalized representation of the policy can be translated into an entity permissions map. Such a map defines the relationship between entities and the permission they are configured to have.

The mapping can hold, for example, the list of permissions each entity has, with optional trace back to the policy units or the policy rules that provided the permission. It should be noted that a cloud policy's specification may have a rich syntax. The policy rules may allow or deny permissions. The rules may include logical expressions (e.g., not), and wildcards (to specify a set of permissions). Also, the order of the rules or the policy units may matter. All that is simplified in the normalization to a structure that states what permissions each entity has. The set of permissions to which the normalized representation relate may be atomic capabilities, such as, but not limited to, APIs of service or may relate to some grouping or combination of capabilities appear in the policy rules, e.g., set of resources, or IP addresses.

In an embodiment, to normalize a policy, the policy is parsed. Then, each parsed policy rule is translated into a normalized representation by applying logic related to the semantic of the rule or other rules that may affect the rule. For example, in a network access policy that denies rules appearing higher in the list, may affect what is actually permitted by allowing the list to appear further down the list.

The translation may require resolving potential contradicted configurations among various policy rules or various policy units. To resolve such contradicted configurations, an intersection between a list (or ranges) of permissions granted to an entity and a list (or ranges) of permissions disallowed to the same entity is found. In addition, an intersection between a list (or ranges) of permissions excluded to an entity and a list (or ranges) of permissions denied to the same entity is found.

Following are some examples for translating policy rules into normalized representations. As an example, a policy rule is defined using wildcard: "Allow user x to use APIs of service y of the form describe*" The translation enumerates the list APIs of service 'y' whose name starts with "describe", and associates all these specific APIs as permissions of user 'x'.

As another example, a policy rule is defined using a "NOT" operator, "Allow user x to use service y, but NOT APIs w, and z". The translation enumerates the list APIs of service y, excludes from that list APIs w, and z, and associates that list to user x.

As yet another example, a policy rule is defined for groups of entities: "Allow entity group g to use APIs a, b, and c of service y". The translation enumerates the group members of group 'g', and associates the permissions of using APIs a, b, c of service 'y' to each of the group members. It should be noted that the information about the entity group(s) of each entity is preserved for later decision on hardening recommendations.

As yet another example, a policy rule is defined for resources: "Allow user u to read files from storage buckets b1 and b1". The translation associates the list of buckets as read permissions of user 'u' (<read, b1>, <read b2>). Each of these buckets (storage areas) may hold folders and sub-folders, but it is not necessarily needed, to enumerate these folders (unless there are other rules that relate explicitly to folders of these buckets and may impose contradiction).

As yet another example, a policy rule is defined for a machine network access permission: "Allow machine m to get access from IP addresses 123.41.25.0/24 to TCP port 22')". The translation logic may translate the source IP address to ranges of addresses (can be held as ranges of integers) and associates the machine permissions of the form <GET, source: 123.41.25.0-123.41.25.255, source port: any, dest port: TCP/22>.

As yet another example, a policy rule defined using a deny rule: having the rule "Deny access of machine x to resource y", and then "Allow access of machine x to resource y, w, and z". The translation of the rule may be held in an intermediate normalized form with a deny indication. For example, deny: {y}. Then the scope of deny: {y} is subtracted from the scope of allow {w, y, z}, to get the final normalized representation: allow {w, z}.

Each granted permission in the normalized representation may hold traceback information regarding the policy units and the policy rules that granted the permission as more than one policy unit may allow the same permission. In certain embodiments, the traceback information may hold reference to rules and policy units that denied (or excluded) a permission allowed by other policy units or rules.

The policies in their normalized representation are saved, for example, in the policy storage (e.g., storage 130, FIG. 1).

At S220, activity logs are collected. The activity logs may be collected from cloud log services, log recording devices, network devices, infrastructure of the cloud computing platform, servers deployed in the cloud computing platform, and so on.

In an embodiment, any activity log describing cloud actions related to gathered policies is collected. Examples for activity logs include: API calls to services provided by the cloud vendor, logs of network communication or of some aggregation of network communication, system logs of cloud servers (e.g., Linux®, Windows®), DNS logs, and so on. It should be noted that S210 and S220 may be performed in parallel or in a different order.

At S230, permission usage maps are generated based on the collected activity logs and the normalized policies (a representation of the permissions used by each cloud entity). The permission usage map represents the permissions granted and the permissions used by each cloud entity. In one embodiment, the permission usage map may be represented using a list of the permissions granted for cloud entities, and with indications related to whether these permissions were used or not.

Figure 3:
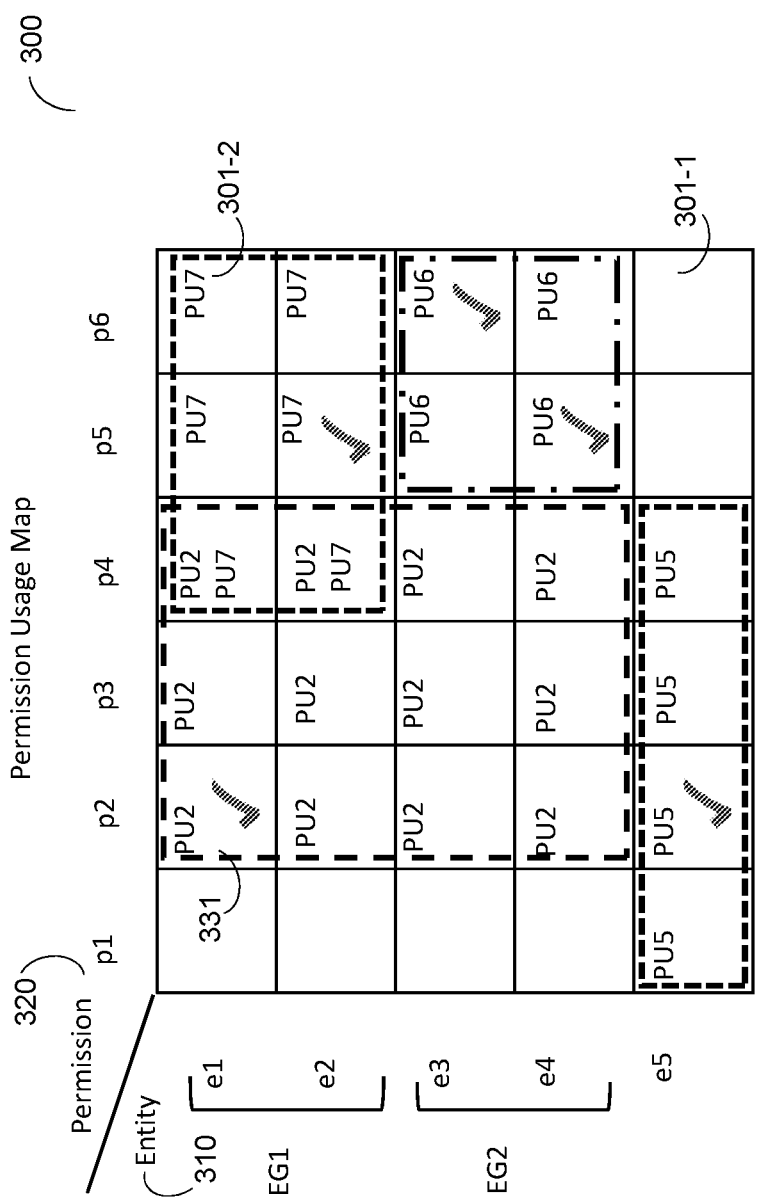
FIG. 3 illustrates a permission usage map structured according to an embodiment.

In another embodiment, illustrated in FIG. 3, the permission usage map can be represented using a matrix 300. The matrix 300 may represent a list of cloud entities 310 (e1, e2, e3, and e4) and permissions 320 (p1, p2, p3, p4, p5, p6). The cloud entities may be grouped (EG1 and EG2).

In the matrix 300, each cell 301 may be expressed by a combination of cloud entities and permission occurrences. A value of each cell 301 indicates whether or not a permission was granted to a respective cloud entity. For example, a cell 301-1 indicates that a permission 'p6' was not granted to an entity 'e5', and a cell 301-2 indicates that a permission 'p6' was granted to an entity 'e1'.

Examples for combinations <entity, permission> that may be represented by the cells 301 are: <user, Service API>, <user, Service API, Resource> and <user, Storage API, Storage folder>. In these examples, the cloud entity is a user, and the permission relates to a service API, a combination of a service API and a resource, or a combination of a storage API and a storage folder.

Other example combinations that can be designated in the permission usage map, the cloud entity is a virtual machine, and the permission relates to allowed network access for that the combination of <machine, sourceIP_destinationIP_destinationPort>. In that example, either the source IP or the destination IP relates to the machine. The source IP, the destination IP, and the destination port may be a single allowed value, a range of allowed values, or a list of ranges of allowed values. The map may also contain some attributes of usage, such as the amount of actions performed for each permission and the last usage time.

In an embodiment, the permission usage map may be utilized to hold a traceback information to the policy units that were involved in granting the permissions. These policy units are indicated in FIG. 3, using dashed rectangles. The name of the policy unit appear in the cells of the rectangle. For example, a policy unit PU2 (labeled as 331) is responsible for granting permission p2, p3, and p4 to entities e1, e2, e3, and e4. Other policy units depicted in FIG. 3, are not explicitly labeled.

It should be noted that the map may be a multi-dimensional (at least two-dimensional) matrix (or table). Optionally, the permission usage map may be complemented with predicted future usage. Further, risk and exposure metrics can be derived and associated with entities or permissions in the map. The processes for complementing the map with such additional information is discussed below with reference to FIG. 7.

Returning to FIG. 2, at S240, based on the analysis of the permission usage map, hardening gaps are identified or otherwise discovered. The hardening gaps are between granted permissions and their actual or potential usage. A hardening gap may be related to a policy unit, multiple policy units, a policy rule, an entity, or an entity group.

As discussed herein, the permission usage map holds usage information on permissions granted by the policy. In addition, the map may maintain information on likely to be used permissions (based on prediction future permission usage), and information on the risk of permissions. The permission usage map may also hold traceback information on rules and policy units that granted the permissions.

In an embodiment, S240 includes iterating through different scopes of the policy (e.g., policy units) and the involved entities (e.g., entity groups). In each such scope, hardening gaps of different types are searched and detected and hardening gaps are recorded. As an example, when iterating through the policy units, for each policy unit, the permission usage maps are extracted, the policy unit is scoped, and hardening issues in the scoped permission usage map are identified.

In an embodiment, the scoped map of a policy unit is based on permissions granted by the policy unit, and the entities or the entity groups that are associated to the policy unit. The permission usage map may specify the following for each combination of entity and permission: "is the permission allowed for the entity?", "is the permission used by the entity?", "is the permission granted to the entity by other policy units?", "is the permission denied for the entity by other policy units?", "is the permission likely to be used by the entity in the future (or the likelihood level)?".

Figure 4A:
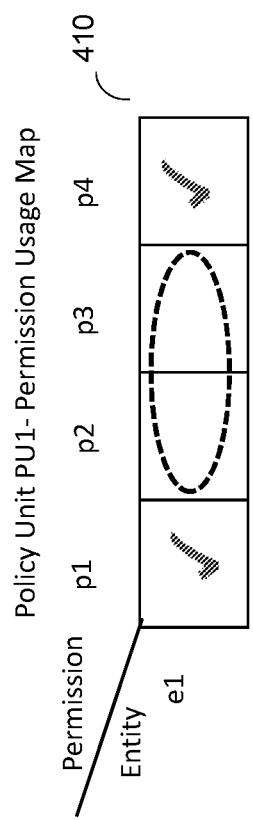
FIGS. 4A, 4B, and 4C illustrate scoped permission usage maps of policy units.
Figure 4B:
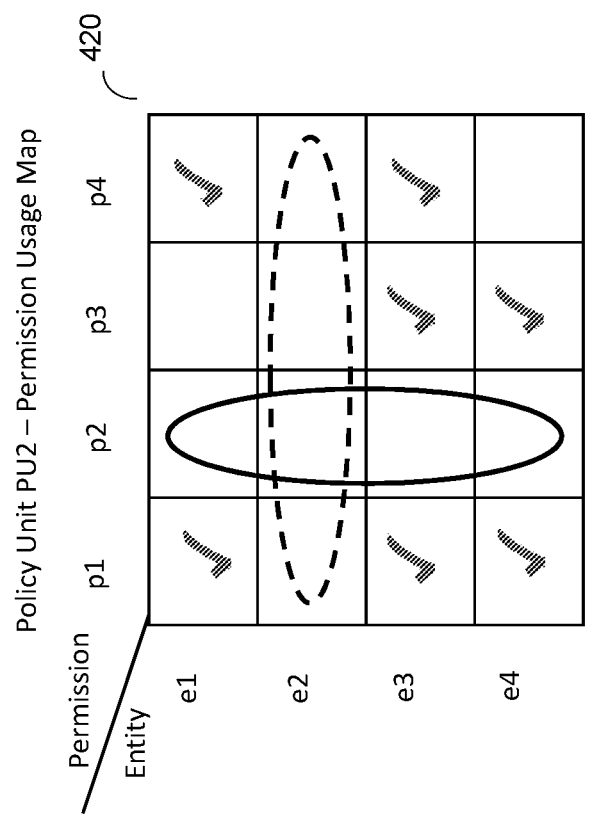
Figure 4C:
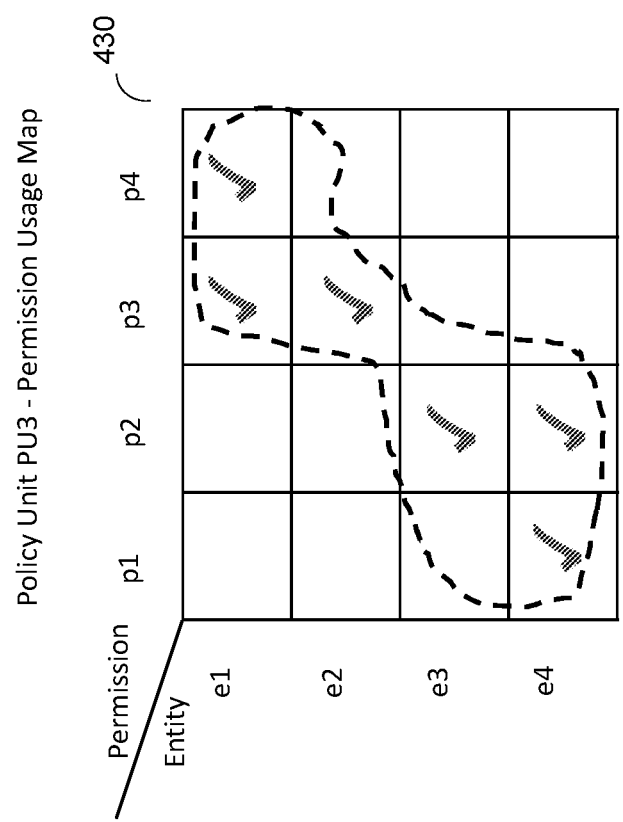

FIGS. 4A, 4B, and 4C illustrate scoped permission usage maps of policy units. For the simplicity of the explanation, the permission usage maps in the FIGS. 4A, 4B and 4C relate only to usage information permissions.

In an embodiment, searching for hardening issues in the scoped permission usage map includes applying different types of hardening checks. Such checks may include discovering entities or entity groups that do not use any permissions of the policy unit (and, optionally, are not predicted to do so in the future). For example, in the permission usage map 410 depicted in FIG. 4A, permissions 'p2' and 'p3' are not used by 'e1'. In the permission usage map 420 shown FIG. 4B, no permissions of a policy unit (PU2) are used by entity 'e2', and the permission 'p2' is not utilized at all. Thus, PU2 demonstrates permission utilization of 44% (7 out of 16 cells). FIG. 4C shows permission utilization of 38% (6 out 16 cells) which is a relatively low utilization and thus the permission usage is partial and uneven. That is, the permission usage map 430 depicted in FIG. 4C, the permissions 'p1' and 'p2' are used only by entities 'e3' and 'e4', while permission 'p3' and 'p4' are used by another subset of the entities that include 'e1' and 'e2'.

Thus, at S240, low usage, as for example demonstrated in FIG. 4C, of the granted permissions in the policy unit as well as permissions of high risk that are not used (or are rarely used) by entities or entity groups may be identified.

In an embodiment, S240 further includes iterating through sets of policy units and the scope of all policy units. This is very similar to what is described herein for a single policy unit, but with a wider scope in terms of the considered permissions and entities. The iteration can be performed through entities or entity groups, considering all the permissions granted to the entity or entity group by all policy units.

Figure 5:
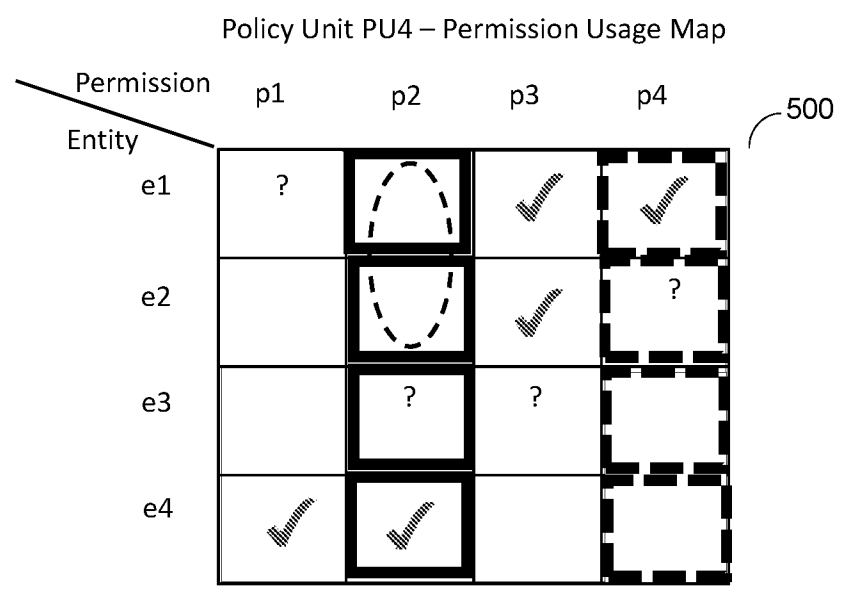

In an embodiment, the discovery may be of richer attributes in the permission privilege map rather than just usage information. FIG. 5 illustrates possible attributes of a permission privilege map 500 of a policy unit (PU4). The attributes distinguish if a permission was given to an entity only using that policy unit (PU) or not, and whether there are permissions that denied for some entities by another policy unit (for example, by another policy unit with higher priority). The attributes may specify the risk of the permissions.

In this example 'p2' is a high risk. The permissions that are not used but are likely to be used (based on future usage prediction) are marked as so. For example, permission 'p2' was not used by 'e3' but is likely to be used by the entity 'e3' in the future.

In the example shown in FIG. 5, the discovery of hardening gaps relates to the permissions' risks. That is, entities 'e1' and 'e2' are discovered as having a high-risk permission 'p2'. The entity 'e3' also does not use the risky permission 'p2', but since 'e3' is likely to be used, the respective combination <e3, p3> is not included in the discovered gap.

Returning to FIG. 2, at S250, a score is computed and assigned to any discovered hardening gap. The score may express the potential risk reduction achieved by addressing the discovered hardening gaps. The score may be based on the user preferences regarding priority of addressing such gaps. In an embodiment, a higher score indicates a higher importance of addressing to a discovered hardening gap.

The risk score may consider the risk score of the unused (or rarely used) permissions reported in the discovered hardening gap (assuming a risk was associated to permissions). The risk score may also consider the magnitude of these unused permissions (e.g., the amount of allowed capabilities). The risk computation may involve aggregation (e.g., summing) the risk scores of the unused permission occurrences over all involved entities. The score can be used for prioritizing the list of hardening gaps to be handled, and for filtering discovered gaps with relatively low risk scores.

At S260, hardening recommendations are generated based on the discovered hardening gaps and computed risk scores. Each recommendation may address hardening gaps and associate these recommendations with such gaps. In an example embodiment, a hardening recommendation suggests a means to fix, fully or partially, a discovered hardening gap. More than one hardening recommendation may be associated to a hardening discovered hardening gap. The hardening recommendations may relate to alternative or complementary means to address the discovered hardening gaps. That is, resolving or reducing the reported gap between granted permissions and their usage.

The hardening recommendations relate to changes to be applied to the policy being processed. Examples for possible hardening recommendation types are: remove a permission (or set of permissions) from a policy unit; disassociate a policy unit from an entity or entity group; split a policy unit into two (or more) policy units; re-associate the entities to the new policy units according to their needs; split an entity group into two (or more) entity groups; and re-associate policy units that were associated to the original entity group. The association is performed to the new groups according to their need.

The recommendation includes the required details on the permissions and entities involved in the specified changes. The recommendations may be formatted as high-level description displayed or reported to the user. Alternatively or collectively, the recommendations may be formatted as a set of detailed change instructions according to the policy editing interface.

In one embodiment, the generation of the hardening recommendations is based on a set of predefined rules (or logic). Such rules map each type of hardening gap to one or more hardening recommendations. As an example, when the discovered hardening gap relates to an entity that does not use any permissions of a policy unit, the recommendation can be to disassociate the policy unit from the entity.

In another an embodiment, the recommendation type is formalized as a search or an optimization method. In this embodiment, a set of hardening recommendation types is used. Each hardening recommendation type is defined using a set of scope parameters that have to be specified in order to transform the hardening recommendation type to a concrete hardening recommendation. The scope parameters may relate to the entities or permissions to which the recommendation should be applied.

As an example, when selecting the hardening recommendation type "Remove a permissions from a policy unit", the set of permissions to be removed has to be determined. The process for generating recommendations may include iterating through possible selections of hardening recommendation types for discovered hardening gaps, and through the relevant parameter settings for these hardening types.

It should be noted that selecting a candidate hardening recommendation type and setting its parameters produces a new policy state (the state of the policy if the recommendation candidate was applied to it). The expected value and "costs" of that change are computed, and are associated with that recommendation candidate.

In an embodiment, S260 includes iterating through phases of producing candidate recommendations for discovered hardening gaps and selecting candidates that are expected to produce high value and relatively low costs that also match different predefined constraints. This allows for generating a set of alternative hardening recommendations which are less costly.

A value of a hardening recommendation is the expected reduction in risk that such recommendation would achieve. The cost of a hardening recommendation may relate to several factors such as, but not limited to, the complexity of implementing the recommendation (e.g., the implementation may require many policy editing actions), an increase in the policy complexity (e.g., if the policy became very detailed), potential rework costs of returning to entities permissions that were removed due to over hardening (removing permission that are later found as needed), and so on.

The value and the cost of a hardening recommendation may be combined into one score that expresses the trade-off between the two. The tradeoff can be affected by user preferences related to organizational hardening priorities and associated costs.

In an embodiment, the hardening recommendations may be based on learned user preferences. Such preferences may define priorities and trade-offs related to hardening recommendations. The user preferences are learned (e.g., by the system 120) based on the user's feedback on past recommendations.

Figure 6A:
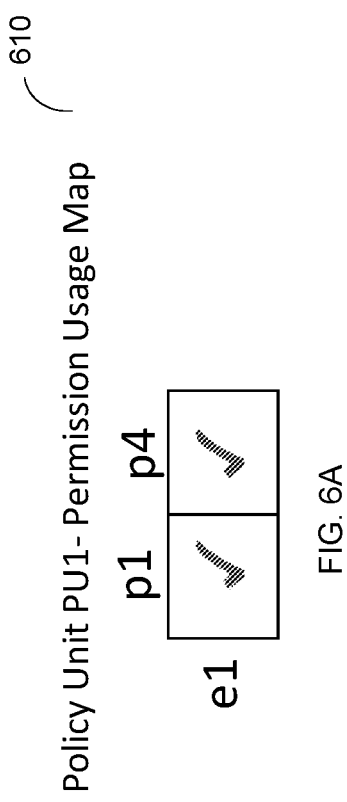
Figure 6C:
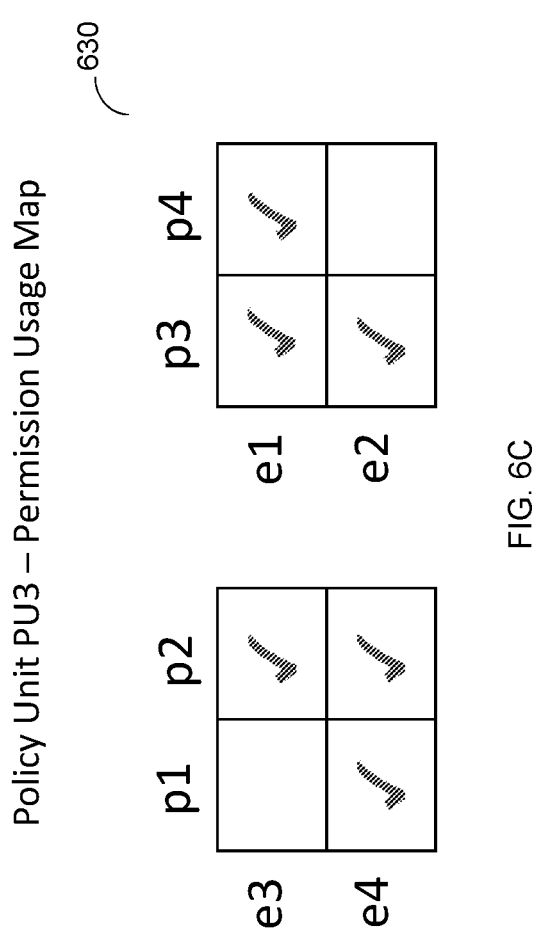

FIGS. 6A, 6B, and 6C illustrate hardening recommendations applied to the hardening gaps shown in FIGS. 4A, 4B, and 4C, respectively.

In a permission usage map 610 of the policy unit (PU1) shown in 6A, the recommendation for the policy unit (PU1) is to remove permissions 'p2' and 'p3' from the policy unit. In a permission usage map 620 of the policy unit (PU2) shown in 6B, the recommendations for the policy unit (PU2) are to remove permission 'p2' and to dis-associate 'e2' from PU2. In a permission usage map 630 of the policy unit (PU3) shown in 6C, the recommendations for the policy unit (PU3) is to split PU3 into 2 policies and to associate the entities accordingly. In all the above example recommendations, the unused permissions are significantly reduced.

At S270, the hardening recommendations are applied to the respective policies. This includes modifying the policies that were analyzed and determined as required for hardening. In an embodiment, S270 includes translating the recommendations into a script of policy change instructions supported by the cloud or entities within the cloud computing platform. The policy change instructions may be applied to the cloud environment and its entities using, for example, API calls. In an embodiment, translation of hardening recommendations (which relate to permissions) to change instructions (which relate to the policy structure), may require tracing back of information of the permissions granted to entities (i.e., which policy rules are responsible for the permission), or alternatively searching in the policy for the policy rules which grant the permissions.

In some embodiments, S270 may include providing a user with a specific manual as how to implement the hardening recommendations so to allow provisioning of the cloud entities.

The method can be performed continuously or on-demand to ensure the policies are well provisioned.

Figure 7:
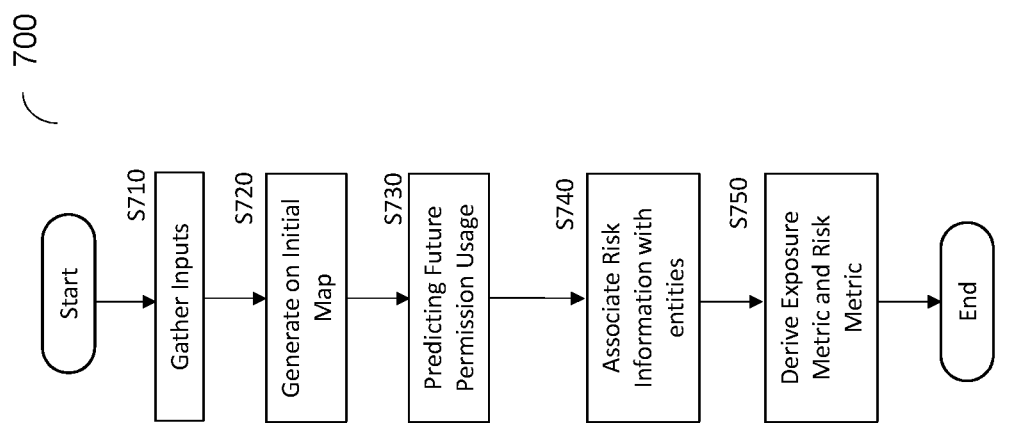
FIG. 7 is a flowchart illustrating a method for enhancing information of a permission usage map according to an embodiment.

FIG. 7 is an example flowchart 700 illustrating a method for enhancing information of a permission usage map according to an embodiment.

At S710, the inputs required to generate a permission usage map are collected. The inputs include at least activity logs and normalized policy representation (both have been discussed above). A permission usage map represents the permissions granted and the permission used by each entity.

At S720, based on the inputs, an initial permission usage map is generated. An example for such a map is provided in FIG. 3. In an embodiment, S720 includes reading the activity logs and normalized policy representations; aggregating the logs to deduct distinct usage values of entities according to a desired granularity; matching the aggregated usage information of entities with the permissions in the normalized representation granted to these entities; and saving the initial permission usage map.

Thereafter, the initial permission usage map is complemented with future usage permissions and risk information associated with the various entities. Specifically, at S730, future usage permissions are predicted based on a permission usage repository.

Future usage permissions are permissions which have been granted to an entity but have not been used yet, and are likely to be used in the future. That prediction is intended to limit the hardening of unused permissions that are likely to be needed by an entity in the foreseen future. The prediction may be performed by examining the current set of used permissions of an entity, looking at other entities that use similar permissions, and considering what other permissions they use or started to use.

In an embodiment, machine learning techniques can be used for the prediction. An example for such techniques may include a collaborative filtering algorithm. Such an algorithm uses a wide set of permission usage maps, possibly from different environments, to learn usage patterns. This map may be stored in a permission usage repository, which can be accessed by the algorithm.

The output of the prediction step may be of different forms including, but not limited to, a binary (0/1) value (i.e., '1' if the permission is likely to be used by the entity and '0' if not), a number between '0' and '1' that expresses the likelihood of the permission to be used, and a level (e.g., Low, Medium, High).

The information on the predicted future usage permissions is added to the permission usage map. For example, user 5C did not use granted API IV, but is likely to do so.

At S740, in this stage, risk information is associated with permissions of entities. As permissions enable entities to use capabilities or cloud actions optionally related to some resources, the risk of permission considers the risk or sensitivity of capabilities (or cloud actions), entities, and resources.

The risk of capabilities (or cloud actions) is the risk of a capability (or cloud action) if available for an attacker. That risk may be based on some predefined knowledge or research analysis regarding cloud cyber-attacks, and the potential contribution of capabilities to such attacks. In general, permitted capabilities that would assist a potential attacker to perform successful attack actions or achieve important privileges should be considered as high-risk capabilities. Examples for high risk capabilities are creating new users in the cloud computing platform, updating privileges of other users, and changing access rules of machines. When the permission relates to a plurality of possible capabilities (or actions), a risk score might be associated to an atomic capability, and the permission score is computed using some aggregation function (e.g., sum) of the capabilities allowed by the permission.

The risk of resources is the importance or the sensitivity of the resource. For example, the risk of a storage folder that holds sensitive information is high. The risk level for resources can be defined by the user of the provisioning system (see FIG. 1) or may be computed based on different heuristics.

The risk of an entity indicates the importance or the sensitivity of the entity. For example, a database server can be considered as a sensitive entity and accordingly its associated risk will be high. The risk of entities can be defined by the user of the hardening system or be computed using different heuristics (e.g., identifying databases based on the used ports or running processes).

The risk of a granted permission is a combination of the risk of the permitted capability, the involved entities, and the involved resources. Aggregation functions, such as weighted sum or max, can be used for computing the risk of the information.

The risk information is added to the initial permission usage map, thereby producing a complete permission usage map. For example, the map may include statements like the following: user 5C was granted but did not use API 'z'—a high risk API; user 5C was granted but did not use API 'w'—a medium risk API.

At S750, at least one risk metric, at least one exposure metric, or both, are derived from the complete permission usage map. Such metrics indicate the hardening level of the policy. In an embodiment, an exposure metric may be computed based on the rate of unused permission occurrences. A permission occurrence is a permission granted to an entity, the permission may be used or unused. The rate is the total number of unused permission occurrences divided by the total number of permission occurrences.

In an embodiment, risk metrics relate to the fact that there are permissions (or permission occurrences) with higher risk levels than others. Such a risk metric may be, for example, the sum of risks of the unused permission occurrences divided by the sum of risks of all permission occurrences. The risk metrics could also be defined in absolute terms. For example, by summing the risks of the unused permission occurrences (or using some other aggregation function).

The risk metric can be computed to different scopes of a policy: the whole policy, policy unit, entity group, or entity. The metric can be used for comparing different parts of the cloud computing platforms, and may assist in focusing at areas where the risk or exposure are higher. The risk metric can also be used to track after trends, understanding whether the hardening level improves (or the risk reduces), or is kept in a reasonable status along time.

Figure 8:
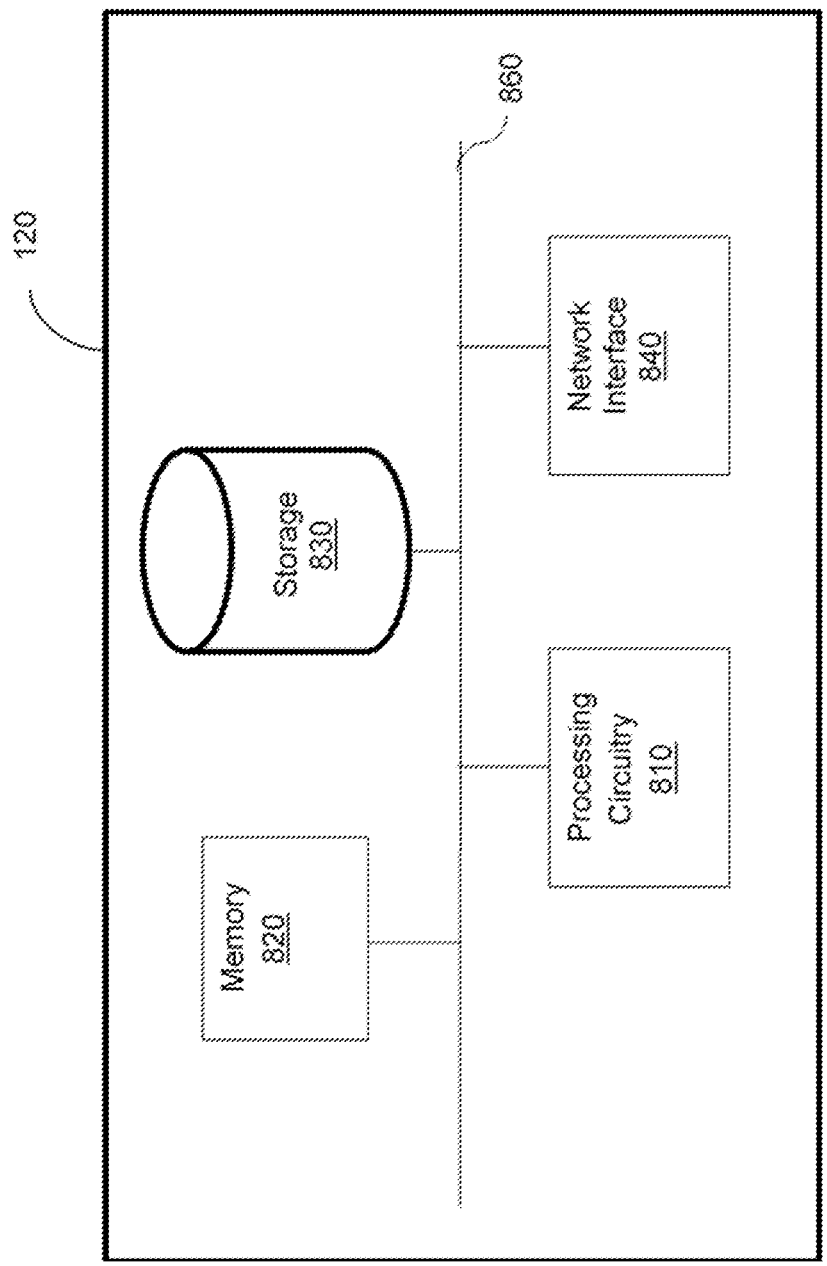
FIG. 8 is a block diagram of a provisioning system implemented according to an embodiment.

FIG. 8 is an example block diagram of the provisioning system 120 according to an embodiment. The provisioning system 120 includes a processing circuitry 810 coupled to a memory 820, a storage 830, and a network interface 840. In an embodiment, the components of the provisioning system 120 may be communicatively connected via a bus 860.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing unit (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., RAM, etc.), non-volatile (e.g., ROM, flash memory, etc.), or a combination thereof. In one configuration, computer readable instructions to implement one or more embodiments disclosed herein may be stored in the storage 830.

In another embodiment, the memory 820 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various processes described herein. Specifically, the instructions, when executed, cause the processing circuitry 810 to harden policies of cloud entities, as discussed hereinabove. In a further embodiment, the memory 820 may further include a memory portion including the instructions.

The storage 830 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 830 may store is configured to store information required for the system operation. That information may include the collected activity logs, intermediate results, user preferences, hardening recommendations, and a user feedback, and machine learning models.

The network interface 840 allows the provisioning system 120 to communicate with the monitoring systems in order to receive telemetries and alerts related to traffic behavior. The network interface 840 further allows the provisioning system 120 to communicate with the various networks.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one CPUs, GPUs, and their like, a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for hardening cloud security policies of a cloud computing platform, comprising:
    gathering cloud activity logs from at least the cloud computing platform, wherein the cloud computing platform includes a plurality of cloud entities;
    gathering a plurality of cloud security policies provisioned to protect the cloud entities;
    for each of the plurality of cloud security policies, generating a permission usage map within the cloud computing platform, wherein the permission usage map represents the permissions granted to each cloud entity and the permissions used by each cloud entity;
    analyzing the permission usage map to discover at least one hardening gap, wherein each hardening gap is at least a difference between permissions granted and permissions used by a cloud entity;
    for each discovered hardening gap, computing a risk score designating a potential risk reduction achieved by addressing the hardening gap;
    generating at least one hardening recommendation for the at least one hardening gap and its respective computed risk score; and
    applying the at least one hardening recommendation to the respective cloud security policy, thereby hardening the cloud computing platform.

2. The method of claim 1, wherein the cloud activity logs describe cloud actions related to the plurality of cloud security policies.

3. The method of claim 1, wherein each of the plurality of cloud security policies includes at least one policy unit and a set of policy rules defining permissions that the plurality of cloud entities are provisioned with.

4. The method of claim 1, wherein each permission usage map is a matrix of combinations of permissions and cloud entities of the plurality of cloud entities, wherein each cell in the matrix designates usage of a permission by at least one of the respective cloud entities.

5. The method of claim 4, wherein the permission usage map further maintains a traceback of information to the policy units that were involved in granting the permissions.

6. The method of claim 1, wherein generating each permission usage map further comprises:
complementing the permission usage map with future usage permissions and risk information.

7. The method of claim 6, wherein the future usage permissions are permissions that have been granted to a cloud entity but have not been used yet, wherein risk information indicates a risk of granting a specific permission.

8. The method of claim 7, further comprising:
learning permission usage patterns of cloud entities of different cloud environments, wherein the usage patterns are utilized to derive the future usage permissions.

9. The method of claim 6, wherein further comprises:
deriving, from the complemented permission usage map, at least one of a risk metric and an exposure metric, wherein the risk metric and the exposure metric indicate a hardening level of the cloud security policy.

10. The method of claim 1, wherein analyzing the permission usage map to discover hardening gaps further comprises:
iterating through policy units defined in the cloud security policy;
for each policy unit, extracting a permission usage map scoped at the policy unit; and
discovering hardening gaps in each scoped permission usage map.

11. The method of claim 1, wherein generating the at least one hardening recommendation further comprises:
applying a set of predefined rules, wherein each rule maps each type of a discovered hardening gap to at least one hardening recommendation.

12. The method of claim 11, wherein the at least one hardening recommendation includes alternative or complementary means to address each of the discovered hardening gap.

13. The method of claim 11, wherein applying the set of predefined rules further comprises:
translating the at least one hardening recommendation into a script of policy change instructions supported by a respective cloud entity of the plurality of cloud entities.

14. The method of claim 11, further comprising:
associating each hardening recommendation with a value and cost, wherein the value of a hardening recommendation is an expected reduction in risk achieved by the hardening recommendation, and the cost hardening recommendation factors at least a complexity of implementing the hardening recommendation.

15. The method of claim 11, further comprising:
producing candidate hardening recommendations for the discovered hardening gaps;
associating each hardening recommendation with score, wherein the score is based on a value and cost associated with the respective hardening recommendation; and
selecting a hardening recommendation based on the respective score.

16. The method of claim 1, wherein each of the plurality of cloud entities includes: a user, a virtual software entity, a cloud resource, and a cloud service, a cloud application, a role.

17. The method of claim 1, wherein each of the cloud security policies defines an access of at least one cloud entity to a cloud service, an access of a cloud entity to a cloud resource, and a network access between cloud entities.

18. A non-transitory computer readable medium having stored thereon instructions for causing processing circuitry to execute a process for hardening cloud security policies of a cloud computing platform, the process comprising:
gathering cloud activity logs from at least the cloud computing platform, wherein the cloud computing platform includes a plurality of cloud entities;
gathering a plurality of cloud security policies provisioned to protect the cloud entities;
for each of the plurality of cloud security policies, generating a permission usage map within the cloud computing platform, wherein the permission usage map represents the permissions granted to each cloud entity and the permissions used by each cloud entity;
analyzing the permission usage map to discover at least one hardening gap, wherein each hardening gap is at least a difference between permissions granted and permissions used by a cloud entity;
for each discovered hardening gap, computing a risk score designating a potential risk reduction achieved by addressing the hardening gap; generating at least one hardening recommendation for the at least one hardening gap and its respective computed risk score; and
applying the at least one hardening recommendation to the respective cloud security policy, thereby hardening the cloud computing platform.

19. A system for causing processing circuitry to execute a process for hardening cloud security policies of a cloud computing platform, the system comprising:
a processing system; and
a memory, the memory containing instructions that, when executed by the processing system, configure the system to:
gather cloud activity logs from at least the cloud computing platform, wherein the cloud computing platform includes a plurality of cloud entities;
gather plurality of cloud security policies provisioned to protect the cloud entities;
for each of the plurality of cloud security policies, generating a permission usage map within the cloud computing platform, wherein the permission usage map represents the permissions granted to each cloud entity and the permissions used by each cloud entity;
analyze the permission usage map to discover at least one hardening gap, wherein each hardening gap is at least a difference between permissions granted and permissions used by a cloud entity;
for each discovered hardening gap, compute a risk score designating a potential risk reduction achieved by addressing the hardening gap;
generate at least one hardening recommendation for the at least one hardening gap and its respective computed risk score; and applying the at least one hardening recommendation to the respective cloud security policy, thereby hardening the cloud computing platform.

20. The system of claim 19, wherein the cloud activity logs describe cloud actions related to the plurality of cloud security policies.

21. The system of claim 19, wherein each of the plurality of cloud security policies includes at least one policy unit and a set of policy rules defining permissions that the plurality of cloud entities are provisioned with.

22. The system of claim 19, wherein each permission usage map is a matrix of combinations of permissions and cloud entities of the plurality of cloud entities, wherein each cell in the matrix designates usage of a permission by at least one of the respective cloud entities.

23. The system of claim 22, wherein the permission usage map further maintains a traceback of information to the policy units that were involved in granting the permissions.

24. The system of claim 19, wherein the system is further configured to:
complement the permission usage map with future usage permissions and risk information.

25. The system of claim 24, wherein the future usage permissions are permissions that have been granted to a cloud entity but have not been used yet, wherein risk information indicates a risk of granting a specific permission.

26. The system of claim 25, wherein the system is further configured to:
learn permission usage patterns of cloud entities of different cloud environments, wherein the usage patterns are utilized to derive the future usage permissions.

27. The system of claim 26, wherein the system is further configured to:
derive, from the complemented permission usage map, at least one of a risk metric and an exposure metric, wherein the risk metric and the exposure metric indicate a hardening level of the cloud security policy.

28. The system of claim 19, wherein the system is further configured to:
iterate through policy units defined in the cloud security policy;
for each policy unit, extracting a permission usage map scoped at the policy unit; and
discover hardening gaps in each scoped permission usage map.

29. The system of claim 19, wherein the system is further configured to:
apply a set of predefined rules, wherein each rule maps each type of a discovered hardening gap to at least one hardening recommendation.

30. The system of claim 29, wherein the at least one hardening recommendation includes alternative or complementary means to address each of the discovered hardening gap.

31. The system of claim 29, wherein the system is further configured to:
translate the at least one hardening recommendation into a script of policy change instructions supported by a respective cloud entity of the plurality of cloud entities.

32. The system of claim 29, wherein the system is further configured to:
associate each hardening recommendation with a value and cost, wherein the value of a hardening recommendation is an expected reduction in risk achieved by the hardening recommendation, and the cost hardening recommendation factors at least a complexity of implementing the hardening recommendation.

33. The system of claim 29, wherein the system is further configured to:
producing candidate hardening recommendations for the discovered hardening gaps;
associating each hardening recommendation with score, wherein the score is based on a value and cost associated with the respective hardening recommendation; and
select a hardening recommendation based on the respective score.

* * * * *